United States Patent
Palaios et al.

(10) Patent No.: US 12,081,415 B2
(45) Date of Patent: Sep. 3, 2024

(54) ENABLING DATA EXCHANGE BETWEEN FIRST AND SECOND COMMUNICATION NETWORKS HAVING DIFFERENT DATA COMMUNICATION CAPABILITIES

(71) Applicant: Telefonaktiebolaget LM Ericsson (PUBL), Stockholm (SE)

(72) Inventors: Alexandros Palaios, Moers (DE); Abdulrahman Alabbasi, Kista (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/631,029

(22) PCT Filed: Jul. 31, 2019

(86) PCT No.: PCT/EP2019/070625
§ 371 (c)(1),
(2) Date: Jan. 28, 2022

(87) PCT Pub. No.: WO2021/018393
PCT Pub. Date: Feb. 4, 2021

(65) Prior Publication Data
US 2022/0303194 A1    Sep. 22, 2022

(51) Int. Cl.
*H04L 41/5003* (2022.01)
*H04L 47/2491* (2022.01)

(52) U.S. Cl.
CPC ...... *H04L 41/5003* (2013.01); *H04L 47/2491* (2013.01)

(58) Field of Classification Search
CPC .................. H04L 41/5003; H04L 47/2491
See application file for complete search history.

(56) References Cited

U.S. PATENT DOCUMENTS

| | | | |
|---|---|---|---|
| 2019/0281469 A1* | 9/2019 | Wang | H04W 72/27 |
| 2020/0267785 A1* | 8/2020 | Talebi Fard | H04W 40/248 |
| 2021/0273890 A1* | 9/2021 | Ayaz | H04L 47/283 |

FOREIGN PATENT DOCUMENTS

| | | |
|---|---|---|
| CN | 104796955 A | 7/2015 |
| CN | 104812096 A | 7/2015 |

(Continued)

OTHER PUBLICATIONS

3GPP: 3rd Generation Partnership Project, Technical Specification Group Services and System Aspects; Study on enhancement of 5G System 5GS.for Vertical and Local Area Network (LAN) services Version 16. Cited on IDS dated (Oct. 12, 2023) (Year: 2019).*

(Continued)

*Primary Examiner* — Adnan M Mirza
(74) *Attorney, Agent, or Firm* — Baker Botts L.L.P.

(57) ABSTRACT

A method of and a network function arranged for enabling data exchange between a first communication network having first data communication capabilities, such as a 5G network, and a second communication network, such as a TSN, having second data communication capabilities different from the first data communication capabilities. Communication attributes of corresponding first and second data communication capabilities are mapped (41). Communication capabilities available in the first communication network are allocated (42) for use by the second communication network, and the allocated data communication capabilities are advertised (43) to the second communication network, represented in accordance with the attributes mapping (41).

11 Claims, 5 Drawing Sheets

(56) References Cited

FOREIGN PATENT DOCUMENTS

| CN | 106471770 A | 3/2017 |
|---|---|---|
| CN | 107113862 A | 8/2017 |
| WO | 2015028563 A1 | 3/2015 |

OTHER PUBLICATIONS

3GPP TR 23.734 v16.2.0; Technical Report; 3rd Generation Partnership Project; Technical Specification Group Services and System Aspects; Study on enhancement of 5G System (5GS) for vertical and Local Area Network (LAN) services (Release 16)—Jun. 2019.
PCT International Search Report issued for International application No. PCT/EP2019/070625—dated Mar. 27, 2020.
PCT Written Opinion of the International Searching Authority issued for International application No. PCT/EP2019/070625—dated Mar. 27, 2020.
China Patent Office, Office Action and Search Report in China Application No. 201980098938.2 dated Sep. 9, 2023 (not translated).

\* cited by examiner

ENABLING DATA EXCHANGE BETWEEN FIRST AND SECOND COMMUNICATION NETWORKS HAVING DIFFERENT DATA COMMUNICATION CAPABILITIES

PRIORITY

This nonprovisional application is a U.S. National Stage Filing under 35 U.S.C. § 371 of International Patent Application Serial No. PCT/EP2019/070625 filed Jul. 31, 2019 and entitled "Enabling Data Exchange Between First and Second Communication Networks Having Different Data Communication Capabilities" which is hereby incorporated by reference in its entirety.

TECHNICAL FIELD

The present disclosure generally relates to the field of telecommunications systems and, more specifically, to the integration of data communication capabilities of a first communication network, such as a Fifth Generation, 5G, mobile telecommunications network, and a second communication network comprising second data communication capabilities, such as a Time Sensitive Network, TSN.

BACKGROUND

Time Sensitive Networks, TSNs, support deterministic services over IEEE standard 802.3 Ethernet wired networks, thereby providing guaranteed packet transport with low and bounded latency, low packet delay variation, and low packet loss. TSN features can be enabled for specific data streams in a network that also handles best effort type data communications, for example, and in converged industrial networks where data streams from different technology applications with varying timing requirements are carried together on the same network infrastructure.

The Fifth Generation, 5G, Service Based Architecture, SBA, mobile communications technology, among others, provides increased flexibility by parallel multiple services, low latency in wireless connectivity to remote sites across different locations, hence reduced costs with respect to wired connections or a cabling infrastructure, and supports mobile units like autonomous carts or moving Automated Guided Vehicles, AGVs, by increased transmission capacity and speed, compared to previous generations of mobile communications technology.

Accordingly, in an industrial environment, for example, 5G mobile technology provides an excellent solution for connecting devices such as industrial sensors and actuators wirelessly to a TSN. Hence, it is very likely that 5G systems will integrate with TSN for providing deterministic wireless links as cable replacements. In particular, a 5G mobile communications network can extend TSNs to avoid technical and infrastructural limitations of cable installations.

However, to support TSN services over 5G networks, inter-networking of TSN networks and 5G networks has to be enabled.

Current state of the art solutions are based on a static approach of the integration of the two systems, and goes with a number of drawbacks, such as an inefficient utilization of 5G data communication resources, an almost manual configuration of 5G system resources for TSN data streams and, in full load scenario, less 5G system ability to accept more data streams/flows.

Viewed in a more general context, there is a genuine need for a smooth interaction or inter-networking between different communication networks having different data communication capabilities, in particular data communication capabilities comprising different Quality of Service, QoS, and data transmission attributes.

SUMMARY

It is an object of the present disclosure to improve data exchange between a device in a first communication network and a device in a second communication network, wherein both devices have different communication capabilities.

In a first aspect of the present disclosure, there is presented a method of enabling data exchange between a first communication network having first data communication capabilities and a second communication network having second data communication capabilities different from the first data communication capabilities, the first and second data communication capabilities at least comprising different Quality of Service, QoS, and data transmission attributes.

The method comprising the steps of:
- mapping, in a network function of the first communication network, communication attributes of corresponding first and second data communication capabilities, including the QoS and data transmission attributes;
- allocating, by the network function of the first communication network, based on the attributes mapping and communication resources available in the first communication network, first data communication capabilities of the first communication network for use by the second communication network, and
- advertising, by the network function of the first communication network, the allocated data communication capabilities to the second communication network, represented in accordance with the second data communication capabilities based on the attributes mapping.

By mapping communication attributes of first data communication capabilities of the first communication network to communication attributes of corresponding second data communication capabilities of the second communication network, first data communication capabilities allocated in the first network for use by the second communication can be advertised to the second communication network represented as second data communication capabilities.

Accordingly, from the perspective of the second communication network, the first communication network presents itself as a client operating in accordance with a communication protocol used by the second communication network. As the communication networks have different data communication capabilities, such as different QoS metrics and data transmission stream or flow characteristics, the present method facilitates a smooth interaction between the communication networks, without having to change or adapt the communication protocol of the second communication network.

Hence, the method according to the present disclosure is particularly advantageous for enabling data exchange between different communication networks or systems when the communication characteristics or specifications of a communication or transmission protocol of one of the communication networks can not be adjusted.

In an embodiment of the present disclosure, the steps of allocating and advertising data communication capabilities are repeatedly, i.e. over time, performed by the network function of the first communication network, thereby providing a dynamic interfacing of the first and second communication network.

That is, the first communication network determines and allocates its available data communication capabilities in a repetitive manner, for example in accordance with a set repetition rate, while the available data communication capabilities may be advertised with a same or less frequent repetition rate or only if a change in the available or allocated data communication capabilities occurs, such to support efficient utilization of system resources in the first communication network for handling data streams of the second communication network.

To avoid, in the first communication network, a shortage of communication resources for handling data exchange and communication requirements of User Equipment, UE, and communication networks other than the second communication network, in a further embodiment of the present disclosure, the step of allocating data communication capabilities is based on communication resources available in the first communication network excluding communication resources prohibited from being allocated for the second communication network.

In this manner it is effectively avoided that a particular type of data exchange, such as data exchange with the second communication network, takes a leading role in the use of communication resources of the first communication network. The communication resources that are prohibited from being allocated may, for example, be expressed as a certain percentage X of the available resources. For example $10\% < X < 30\%$.

For a similar purpose, in another embodiment of the method according to the present disclosure, allocation of data communication capabilities in the first communication network is based on an estimate of an expected data exchange in the first communication network. That is, the allocation of data communication capabilities by the network function of the first communication network is based on an estimate of future data exchange or data traffic for which communication resources in the first communication network are required. Such an estimate can be based on historical time dependent data communication requirements in the first communication network and/or by monitoring trends in the overall data exchange of the first communication network, for example.

In an embodiment of the method according to the present disclosure, the first communication network is a Fifth Generation, 5G, mobile communications network, and the network function of the first communication network operates as an Application Function, AF, of a Service Based Architecture, SBA, domain in a core network of the 5G mobile communications network.

An AF in a 5G SBA, among others, supports services relating to traffic routing in the network and may interact directly with other Network Functions, NFs, such as a Policy Control Function, PCF, a Session Management Function, SMF, and a User Plane Function, UPF.

Those skilled in the art will appreciate that the steps of the method according to the present disclosure may be executed by or controlled from a single network function in the first communication network, such as the AF or an other NF of the SBA, or by different communicatively interconnected network functions operative in the first communication network.

When implemented in a 5G mobile communications network, the step of advertising allocated data communication capabilities comprises advertising a number of data exchange ports and a supported QoS level of a respective port to the second communication network.

In particular, a number M of data exchange ports each supporting a first QoS level and a number of N data exchange ports each supporting a second QoS level may be advertised, wherein the first QoS level is lower than the second QoS level and M and N being integers with $M>N$.

Generally, a 5G mobile communications network is arranged for exchanging data with a plurality of other communication networks, network functions and User Equipment, UE. In principle three use cases may be distinguished: enhanced Mobile Broadband, eMBB, data-driven use cases, requiring high data rates across a wide coverage area, such as for voice, audio and video data exchange; Ultra Reliable Low Latency Communications, URLLC, comprising strict requirements on latency and reliability for mission critical communications, such as remote surgery, autonomous vehicles or the Tactile Internet; and massive Machine Type Communications, mMTC, supporting a very large number of devices in a small area, which may only send data sporadically, such as Internet of Things, IoT, use cases.

In accordance with another embodiment of the present disclosure, allocating and advertising are further based on fluctuating data exchange characteristics of data exchange between the 5G communication network and other communication networks and User Equipment, UE, wherein at a first fluctuating level a number M of data exchange ports each supporting the first QoS level is advertised and wherein at a second fluctuating level a number N of data exchange ports each supporting the second QoS level is advertised, wherein the first fluctuating level is higher than the second fluctuating level.

In particular the allocating and advertising steps are based on fluctuating characteristics of eMBB related traffic, such that in the case of a high fluctuating demand on eMBB resources in the 5G communications network, a relative large number of data exchange ports each supporting a data communication capability characterised by a relative low QoS level is allocated and advertised. Whereas in case of a less or low fluctuating demand on eMMB resources, a relative small number of data exchange ports each supporting a data communication capability characterised by a relative high QoS level is allocated and advertised. As mentioned above, mixing ports with high QoS and ports with low QoS is also possible. This all, of course, not violating data transmission demands of the second communication network.

For clarity sake, the expression high QoS refers to a rather high data exchange capacity and low latency and jitter, for example, of a respective data exchange port, compared to the optimum or best specifications of the 5G communications system. The expression low QoS refers to a rather low data exchange capacity and possible high latency and jitter, for example, of a data exchange port, compared to the optimum or best specifications of the 5G communications system.

Advertisement of one or the other of the thus disclosed data communication capabilities may depend on a connection failure reported by the second communication network, for example. Such that in case of a connection failure a different one the data communication capabilities may be advertised.

In an embodiment of the present disclosure for integrating data communication capabilities of a 5G mobile communications network and data communication capabilities of a Time Sensitive Network, TSN, network, an exemplary mapping of attributes of corresponding data communication capabilities of the 5G mobile data communications network and communication attributes of the TSN data communication network is listed in Table 1 below.

TABLE 1

Exemplary mapping of 5G mobile communications network and TSN data communication capabilities attributes.
5G attributes corresponding to TSN attributes

| | |
|---|---|
| Guaranteed Flow Bit Rate (GFBR) | Interface speed |
| Maximum Packet Loss Rate | Function of (Static Trees + MRP |
| Packet Delay Budget | Function of (Bridge Delay, propagation |
| Priority level | Qbv traffic classes |
| Maximum Data Burst Volume | MaxFrameSize |

In a second aspect of the present disclosure there is provided a network function, arranged for operating in a first communication network, for enabling data exchange between the first communication network having first data communication capabilities and a second communication network having second data communication capabilities different from the first data communication capabilities, the first and second data communication capabilities at least comprising different Quality of Service, QoS, and data transmission attributes, the network function comprising:
 a mapping module, arranged for mapping communication attributes of the first and second data communication capabilities, including the QoS and data transmission attributes;
 an allocating module, arranged for allocating first data communication capabilities of the first communication network for use by the second communication network, based on the attributes mapping and communication resources available in the first communication network, and
 an advertising module, arranged for advertising the allocated data communication capabilities to the second communication network represented in accordance with the second data communication capabilities based on the attributes mapping.

In further embodiments of the network function, the allocating module and/or the advertising module are arranged for performing further steps of the method according to the first aspect of the present disclosure.

It will be appreciated that the modules disclosed may be implemented as separate hardware and/or software modules and devices, and controlled by or executed in a processor or the like. In particular, in an embodiment of the present disclosure, the mapping module, the allocating module and the advertising module are implemented in at least one processor of the network function of the first communication network.

For a first communication network comprised by a Fifth Generation, 5G, mobile communications network, in an embodiment, the network function of the first communication network is arranged for operating as a an Application Function, AF, of a Service Based Architecture, SBA, domain in a core network of the 5G mobile communications network.

In a third aspect of the present disclosure, a computer program product is provided, comprising a computer readable storage medium storing instructions which, when executed on at least one processor, cause the at least one processor to carry out the method according to the first aspect of the present disclosure.

The above mentioned and other features and advantages of the disclosure will be best understood from the following description referring to the attached drawings. In the drawings, like reference numerals denote identical parts or parts performing an identical or comparable function or operation.

DETAILED DESCRIPTION

Embodiments contemplated by the present disclosure will now be described in more detail with reference to the accompanying drawings. The disclosed subject matter should not be construed as limited to only the embodiments set forth herein. Rather, the illustrated embodiments are provided by way of example to convey the scope of the subject matter to those skilled in the art.

Figure 1:
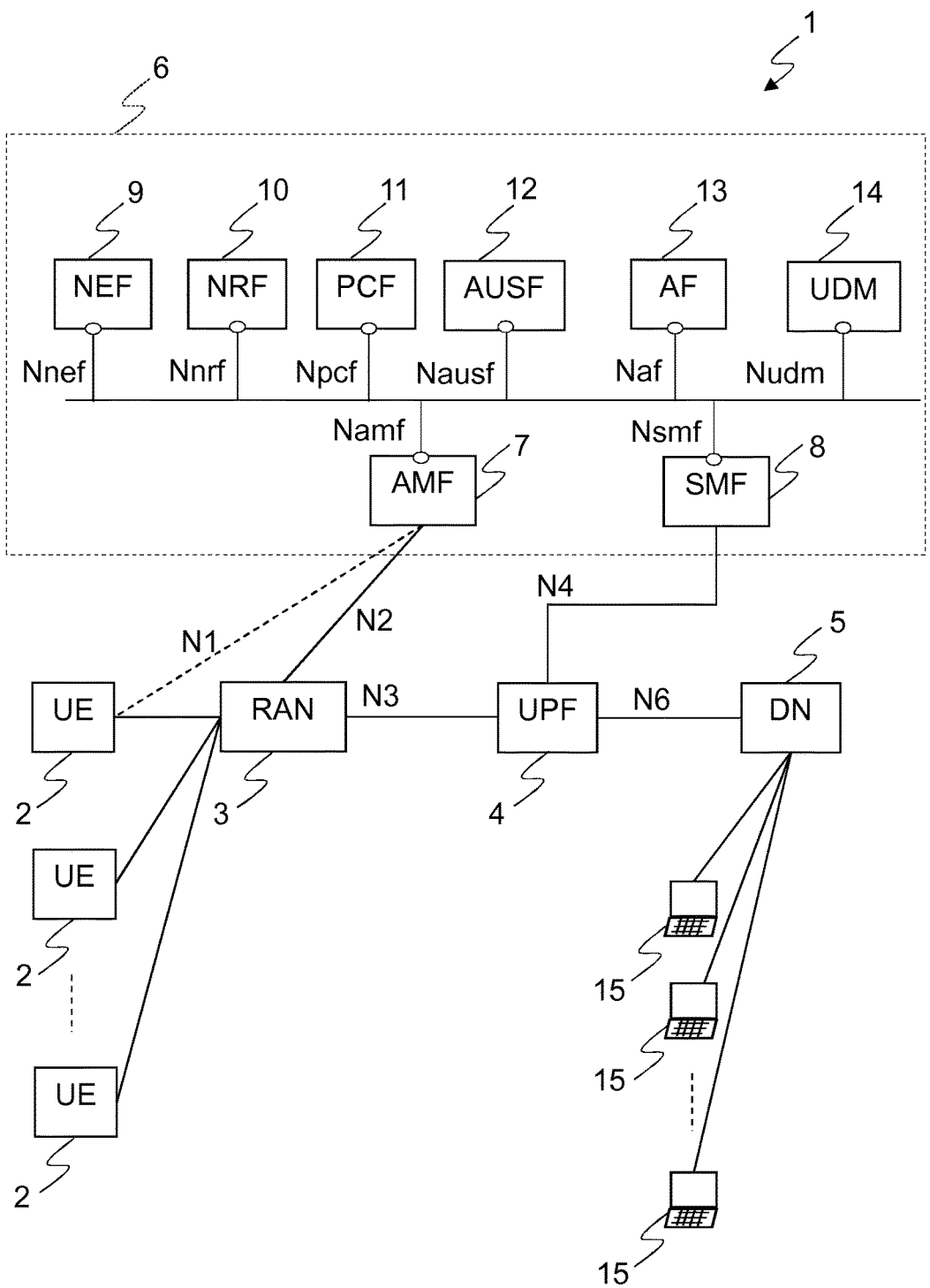
FIG. 1 schematically illustrates a reference network architecture of a Fifth Generation, 5G, communication systems according to the prior art.

FIG. 1 schematically illustrates a reference architecture 1 of a Fifth Generation, 5G, mobile communications network, comprising a Service Based Architecture, SBA, domain 6 generally operative in a Core Network, CN, part of a telecommunications system, in accordance with the prior art.

In 5G, SBA Network Functions, NF, provide one or multiple services to entities, such as User Equipment, UE, operating in the network and requiring communications services from a particular NF. An NF may also request and provide communications services from and to another NF, for example. The NFs of the CN are self-contained functionalities that can be modified and updated in an isolated manner, i.e. without affecting other NFs.

The 5G reference architecture 1 generally distinguishes the following logical Network Functions, NFs:
 Access and Mobility Management Function, AMF, 7
 Session Management Function, SMF, 8
 Network Exposure Function, NEF, 9
 NF Repository Function, NRF, 10
 Policy Control Function, PCF, 11
 Authentication Server Function, AUSF, 12
 Application Function, AF, 13
 Unified Data Management, UDM, 14.

Figure 2:
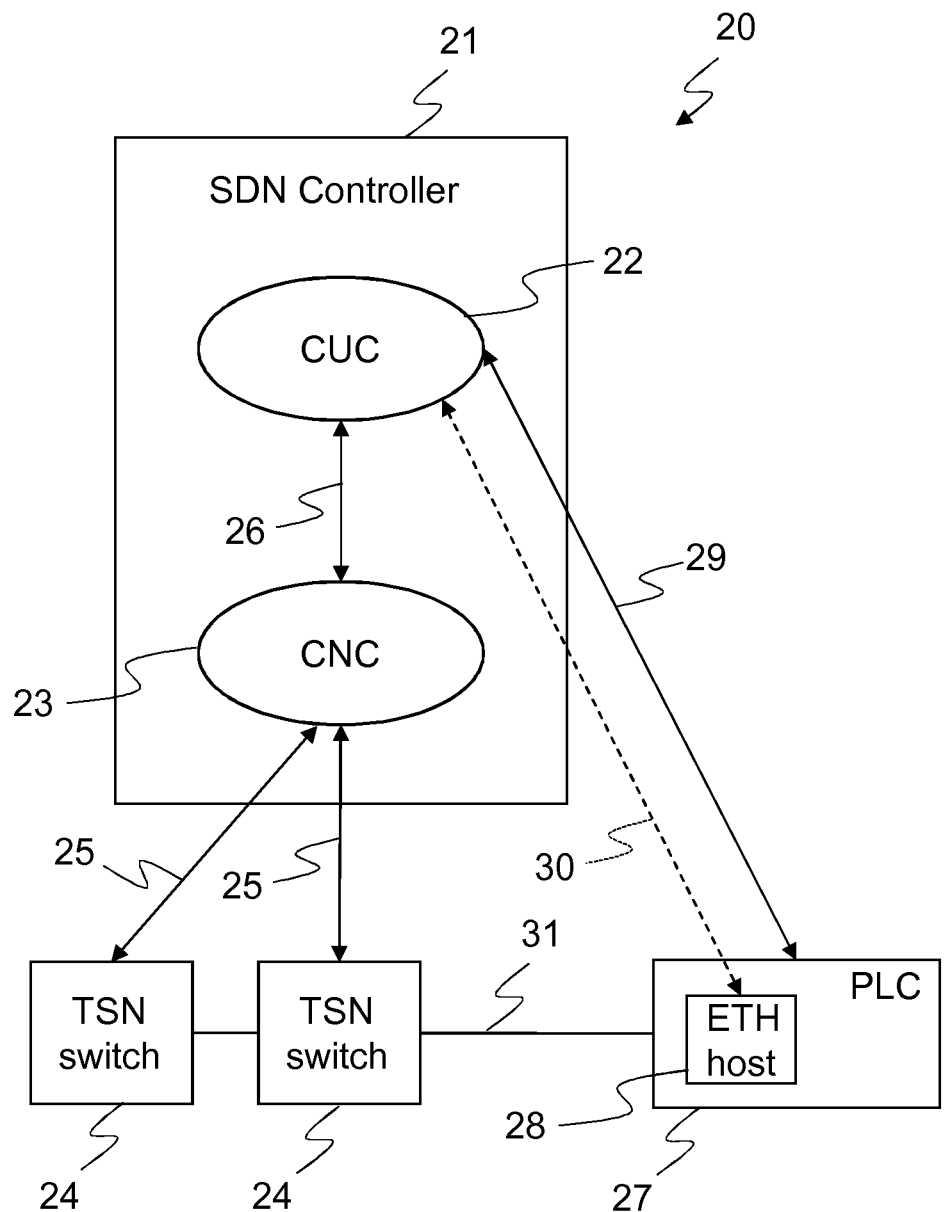
FIG. 2 schematically illustrates a reference network architecture for Time Sensitive Networking, according to the prior art.

The logical NFs 7-14 of the Core Network are built of one or more servers and together form the SBA domain 6. Within the SBA domain 6 service messages are communicated and exchanged over respective communication interfaces, indicated by a capital N followed by one of the above-mentioned abbreviations of the NFs. That is, interface Namf is the service message communication interface towards the AMF 7, etcetera, such as indicated in FIG. 2.

Communication entities supported by the SBA 6 in the core network of a telecommunications system are generally referenced as:

User Equipment, UE, 2,
(Radio) Access Network, (R)AN, 3
User Plane Function, UPF, 4
Data Network, DN, 5, for example operator services or service providers, Internet access, and 3$^{rd}$ party services, like Voice over Inter Protocol, etc.,
Data Equipment, 15.

Operational or signalling messages between the communication entities 2-5, 15 and the SBA domain 6 are exchanged over respective control plane interface functionality, termed N1, N2 and N4, as shown in FIG. 1. That is, interface functionality or protocol N1 pertains to UE related operational messages, interface functionality or protocol N2 relates to RAN operational messages, i.e. exchanged with a node or server in a RAN 3, and interface functionality or protocol N4 pertains to UPF related operational messages. As the N1 related operational messages are exchanged through a RAN 3 to which a particular UE 2 operatively connects, the N1 interface in FIG. 1 is schematically indicated by a dashed line. N3 and N6 are communication interfaces between the UPF 4 and RAN 3 and DN 5, respectively. Communication interface N6 may be arranged for providing enhanced Mobile Broadband, eMBB, for example.

A functional description of the above-mentioned network functions, interfaces and communication protocols is available from the Third Generation Partnership Project, 3GPP, standard 23.501, "System Architecture for the 5G system", the contents of which are included herein, by reference.

In the reference architecture shown in FIG. 1, N1, N2 and N4 are so-called point-to-point communication interface protocols for operational message handling between the SBA domain 6 and a respective network communication entity 2, 3, 4, 15 external of the SBA domain 6. The external communication interface protocols N1 and N2 are implemented in the AMF 7 and the external communication interface protocol N4 is implemented in the SMF 8.

Network Functions, NFs, generally are implemented as software routines or software program code in servers or computer equipment of a cloud network, physical network nodes, and/or other physical entities, for example.

FIG. 2 schematically illustrates a reference Time Sensitive Network, TSN, domain 20, in accordance with the prior art. Time-Sensitive Networking is a set of standards under development by the Time-Sensitive Networking task group of the IEEE 802.1 working group. The standards define mechanisms for the time-sensitive transmission of data over Ethernet networks, the contents of which are included herein, by reference.

Reference numeral 21 represents a so-called Software-Defined Network, SDN, controller or an SDN controller Platform, which is the general control function or control application in a TSN. The SDN Controller platform 21 typically contains a collection of software modules or functions that can perform different network tasks. Some of the basic tasks include discovering and inventorying what or which devices are within the network and the capabilities of each, gathering network statistics, etc. The SDN controller 21 shown typically operates a Central Network Configuration, CNC, function 23 and a Central User Configuration, CUC, function 22, which communicate over a User Network Interface, UNI, 26.

The SDN controller 21 acts as a strategic control point in the TSN network 20, and manages data flow control to TSN switches/routers 24 via the CNC 23, as illustrated by double arrows 25.

Reference numeral 27 refers to a typical application of a TSN in an industrial application, controlled by a Programmable Logic Controller, PLC, 27 connected 31, for data exchange, to a TSN switch 24 and controlled 29 by the CUC 22. The application 27 operates an Ethernet, ETH, host 28 operatively controlled by the CUC 22, as indicated by the dashed arrow 30.

In operation, the CNC 23 learns the physical topology of the network, which includes information gathering about the TSN capabilities of each TSN switch or bridge. CUC 22 is operative for collecting requests for network communication resources. This is the step by which a network engineer will assign 'talker' to 'listeners', while also defining, if needed, requirements for TSN data flows. The collected requests are returned back to the CNC 23.

The CNC 23 now has topology information and will compute resource use schedules and distributes same in the network. Finally, the CUC 22 will program the talker and listeners for TSN flow generation and reception. The TSN switches or bridges can advertise over time different capabilities and the CNC will update as needed the information about the hardware topology.

During transmission path establishment, specific devices might signal back that the requested resources are not available any more. The CUC/CNC 22, 23 holds information on which resource is not available and might try to reconfigure the specific device with other settings, as long as the end-to-end requirements of the TSN network, across the network, are being fulfilled.

A summary of possible enablers for TSN over a 5G mobile communications network is presented in Table 2 below.

In Table 2, the first row refers to a capability specific for a TSN, while the second row lists a corresponding capability of a 5G network. In a practical example, a time critical industrial application scenario might require latency of 1 millisecond, packet delay variation (jitter) of 1 microsecond, and reliability requirements of 99.9999%.

TABLE 2

Summary of enablers for TSN over 5G networks.

| Time synchronization | Low latency transmission | Reliability | Resource management |
|---|---|---|---|
| 5G features to support time reference information | 5G features to support low latency by enhancing physical and medium access layer | 5G features such as advanced antenna techniques, robust control channel design, duplication schemes | 5G features like enhanced scheduling to support cyclic traffic. |

Figure 3:
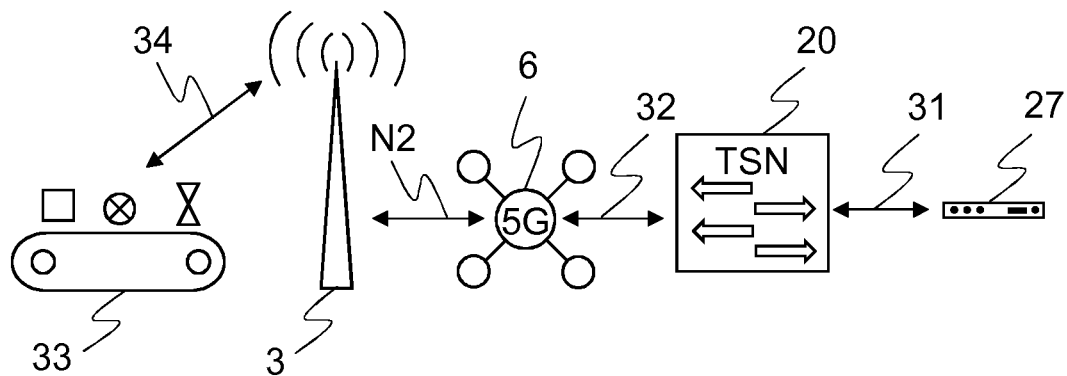
FIG. 3 schematically illustrates end-to-end data communication exchange for a machine connected to an industrial controller, via an inter-networking of a 5G communications network and a Time Sensitive Network, in accordance with the present disclosure.

The present disclosure is schematically illustrated in FIG. 3 by an end-to-end data exchange between an industrial application, like an IoT device or machine 33, connected to a PLC 27, via an uplink/downlink wireless data connection 34 with a next generation NodeB, gNB, of a RAN 3 and the SBA 6 of a 5G network and the TSN 20, to support end-to-end Quality of Service, QoS.

Time synchronization, latency and resource management are enabled by the method according to the present disclosure, over the interface or connection 32, representing the inter-networking between the 5G SBA 6 and TSN 20, based on the exemplary mapping of data communication capabilities attributes of the 5G network and the TSN as shown in Table 1 above.

Figure 4:
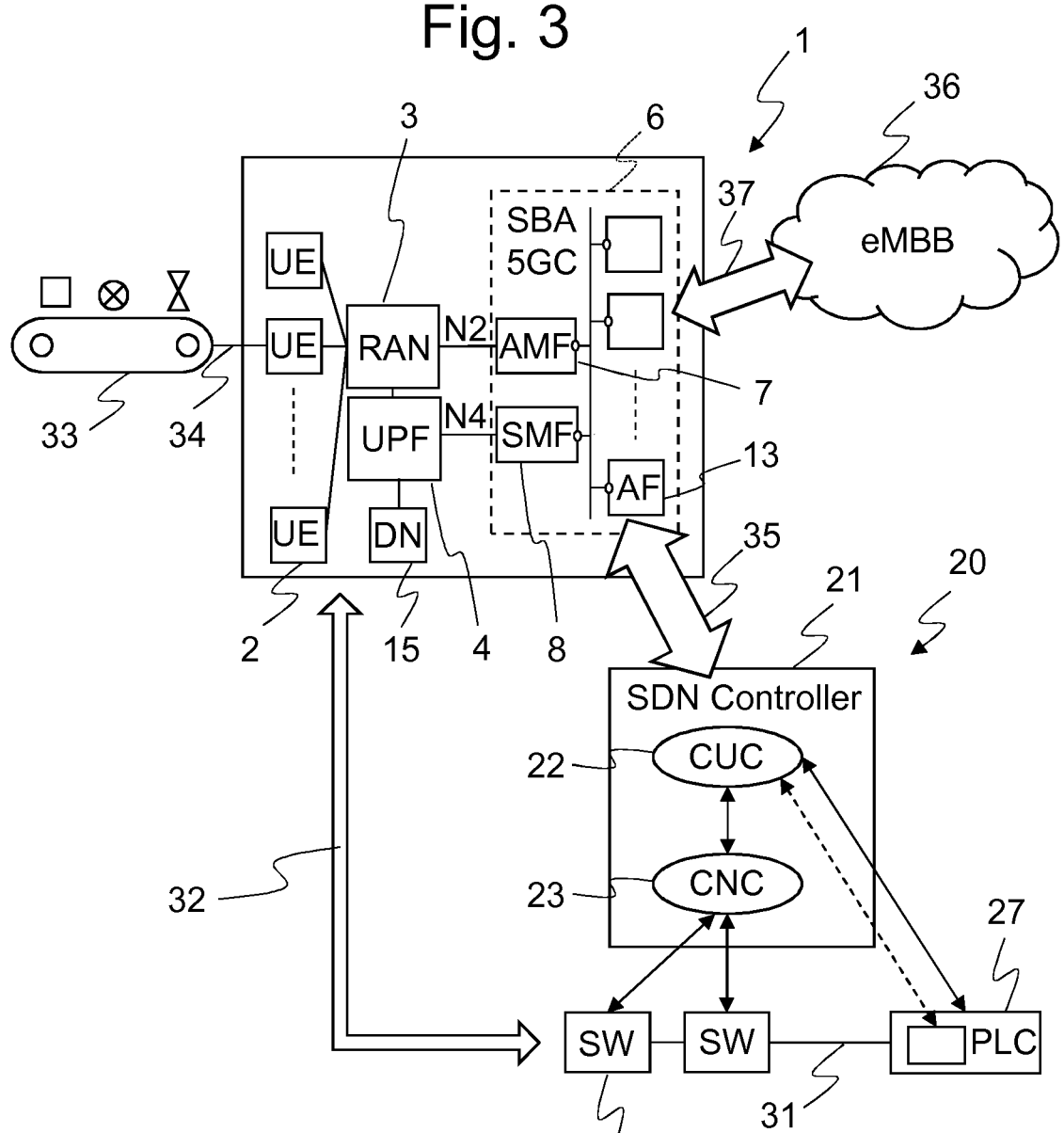
FIG. 4 schematically illustrates inter-networking according to the present disclosure, based on the reference network architectures of FIGS. 1 and 2.

FIG. 4 illustrates the inter-networking of a 5G network 1 and a TSN 20 according to the present disclosure, based on FIGS. 1 and 2 above.

With the present disclosure, from TSN perspective, the 5G network presents itself as a client operating in accordance with a communication protocol available to the TSN 20.

Advertising of data communication capabilities in the 5G network 1 allocated for the TSN 20, in a representation in accordance with the communication protocol available to the TSN 20, based on the exemplary mapping of data communication capabilities attributes as discussed above, is schematically indicated by the double arrow 35 in FIG. 4.

That is, in this embodiment, an interface is created between the AF 13 and the SDN Controller 21, in particular the CUC 22, for inter-networking data communication and signalling between the SBA 6, i.e. the core part of the 5G network 1, and the TSN 1, such that different QoS metrics and data transmission stream or flow characteristics, for example, of the 5G network 1 are presented in the metrics and characteristics of the TSN 1, thereby facilitating a smooth interaction between the communication networks, without having to change or adapt the communication protocol of the TSN 1. Hence, the mobile communications connection provided by the 5G network 1 may be 'experienced' by the TSN 1 as a conventional fixed or cable connection.

Those skilled in the art will appreciate that the 5G network 1, i.e. the SBA core part 6 thereof, in practice, is also arranged for interworking 37 with other communication networks and users, i.e. global Mobile Network Operator, MNO, traffic characteristics, such as providing enhanced Mobile Broadband, eMBB, data exchange 36, as schematically illustrated in FIG. 4.

Figure 5:
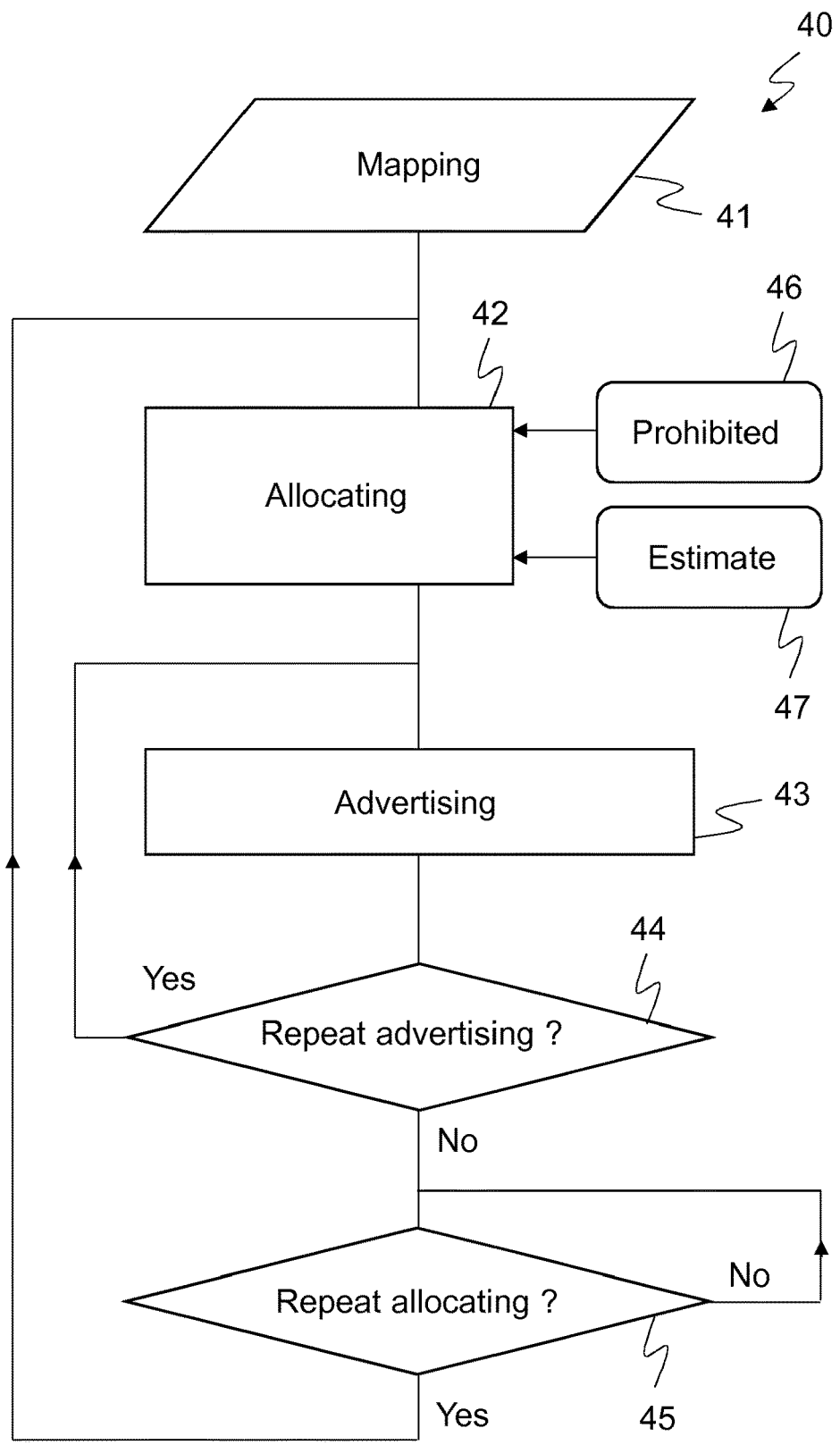
FIG. 5 schematically illustrates in a flow chart type diagram, an embodiment of the method according to the present disclosure.

FIG. 5 schematically illustrates, in a flow chart type diagram 40, an embodiment of the method according to the present disclosure, providing inter-networking between first and second communication networks. In the flow chart diagram, steps follow each other from the top to the bottom of the figure, unless otherwise indicated by a respective arrow.

In a first step 41, "Mapping", corresponding first and second data communication capabilities of first and second communication networks are mapped by or in a network function of the first communication network. That is, communication attributes of data communication capabilities of the first communication network are 'translated' into corresponding communication attributes of corresponding second data communication capabilities of the second communication network. In particular QoS and data transmission attributes are mapped, such as indicated in Table 1 above.

Next, by the network function of the first communication network, first data communication capabilities of the first communication network are allocated for use by the second communication network, based on the attributes mapping and communication resources available in the first communication network, i.e. step 42 "Allocating".

To avoid a shortage of communication resources for handling data exchange and communication requirements of networks and users other than the second communication network, a limited number of communication resources may be allocated for handling data communication requirements of the second communication network, as indicated by block 46, "Prohibited". That is, an amount of data communication capabilities of the first communication network is prohibited from being allocated for the second communication network. The communication resources that are not allowed to be allocated may amount a certain percentage X of the available resources. For example 10%<X<30%, or any other range. This range may be static or dynamically varied, dependent on actual traffic requirements in the first communication network, for example. Of course, any other constrainment may be applied.

Allocation of resources may also depend on an estimate of an expected data exchange in the first communication network, i.e. an estimate of future data exchange or data traffic for which communication resources in the first communication network are required. That is block 47, "Estimate". Such an estimate can be based on historical data communication requirements in the first communication network, such as based on the time of the day, and/or by monitoring trends in the traffic handling of the first communication network, for example.

Once allocated, data communication capabilities available to the second communication network are advertised by the first communication network in a representation comprehensible to the second communication network, as illustrated by step 43, "Advertising". That is, the second communication network is informed by the network function of the first communication network of the allocated resources or data communication capabilities in terms of QoS metrics, transmission characteristics and others of corresponding communication attributes known to the second communication network, based on the attributes mapping 41.

Advertising of respective capabilities or resources may be performed, for example, by exchanging respective advertisement messages over a transmission channel available between the networks, such as over the interface or connection 32, representing the inter-networking between the 5G SBA 6 and TSN 20 shown in FIGS. 3 and 4. Allocation 42 of resources in a 5G network 1 may be performed by an AF 13 in the SBA domain 6, in cooperation with a respective other NF operative in the SBA domain 6, as know to those skilled in the art.

In an embodiment of the present disclosure, the steps of allocating and advertising data communication capabilities my be repeatedly performed by the network function of the first communication network, thereby providing a dynamic interfacing of the first and second communication network.

Decision step 44, "Repeat advertising ?", illustrates repeatedly advertising of capabilities by the first communication network and decision step 45, "Repeat allocating ?", illustrates that the allocating step 42 may be repeated.

That is, the first communication network determines and allocates its available data communication capabilities in a repetitive manner, for example in accordance with a set repetition rate, i.e. decision step 44, result "Yes", while the available data communication capabilities may be advertised with a same or less frequent repetition rate, or only if a change in the available or allocated data communication capabilities occurs.

It will be appreciated by those skilled in the art that the mapping step 41 may be performed once and may be repeated only in case advanced communication capabilities have to be mapped, for example.

In an embodiment of the present disclosure allocated data communication capabilities are advertised in the form of a number of data exchange ports and a supported QoS level of a respective port.

In particular, a number M of data exchange ports each supporting a first QoS level and a number of N data exchange ports each supporting a second QoS level may be advertised, wherein the first QoS level is lower than the second QoS level and M and N being integers with M>N.

Figure 6:
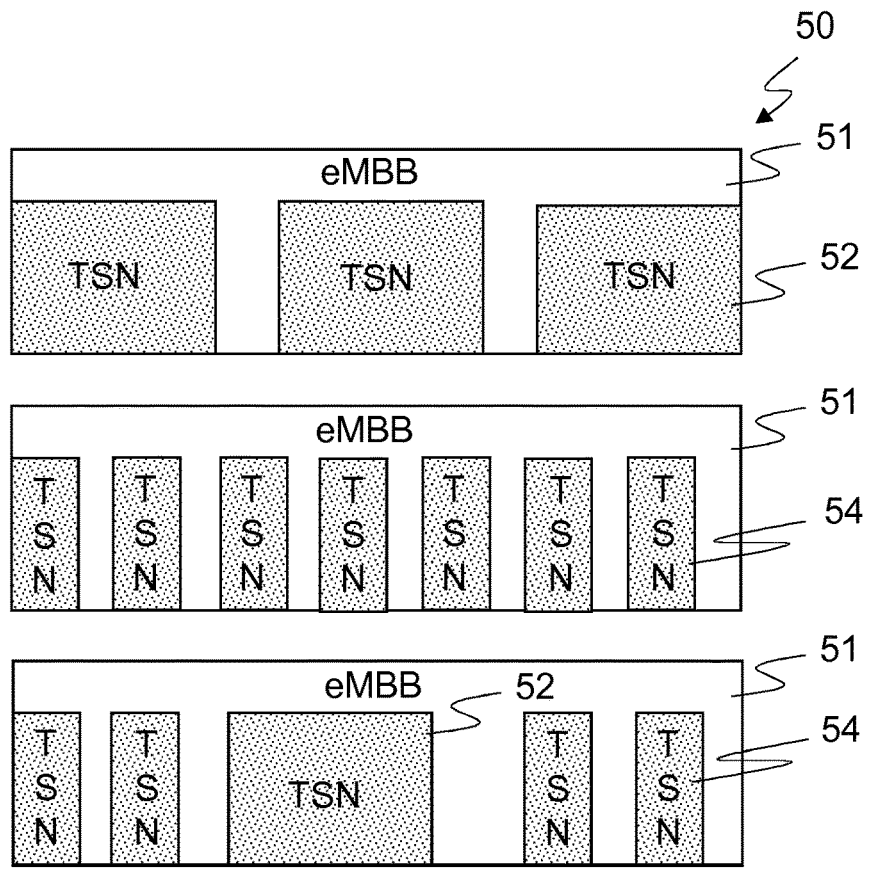
FIG. 6 schematically illustrates an example of advertisement of data communication capabilities in accordance with the present disclosure.

FIG. 6 illustrates an example of a 5G network system considering eMBB traffic characteristics 51 such as fluctuation and volume, when advertising its capabilities, i.e. a number of communication ports and the supported QoS by a respective port, to an industrial TSN operator. In FIG. 6, a block represents a particular communication port and the width of that block represents the QoS support of that port.

The 5G network, in a first scenario, will advertise a relative low number N of ports 52 for TSN CNC, each with a relative high port capability or QoS support, as schematically indicated in the upper part of FIG. 6. In this example N=3. In a second scenario, the 5G network will advertise a relative high number M of ports 54 with a relative low QoS support or capacity, as schematically indicated in the middle part of FIG. 6. By way of example M=7.

This relationship between global network operator traffic characteristics and the advertisement to TSN can be modelled as:

$$SC4L + SC4G\alpha \# Port * C(Port-QoS) \quad (1)$$

wherein: SC4L represents the system capacity designated for TSN traffic,

SC4G represents the system capacity designated for global MNO traffic,

α denotes a relation between the left and right parts of the inequality of equation (1),

Port denotes the number of communication ports, and

C(.) is the capacity needed to support the in-argument QoS.

The term high QoS capability, in connection with FIG. 6, is used to denote not just high traffic volume but also low latency and jitter, for example, of a data exchange port, compared to the optimum or best specifications of the 5G communications system. To the contrary, the expression low QoS refers to a rather low data exchange capacity and possible high latency and jitter, for example, of a data exchange port, compared to the optimum or best specifications of the 5G communications system.

Given a high fluctuation of global MNO traffic demand, the 5GS network may advertise its capability as a high number of ports and low QoS per port, i.e. the middle case in FIG. 6. Whereas in case of a less or low fluctuating demand on global MNO eMMB resources, a relative small number of data exchange ports each supporting a data communication capability characterised by a relative high QoS level may be advertised by the 5G network, i.e. the upper case illustrated in FIG. 6.

A scenario with mixed ports comprising a number of ports with high QoS and a number of ports with low QoS is also possible, as illustrated in the lower part of FIG. 6. Note that the ports 52 not necessarily each have to provide a same QoS, nor do the ports 54. In such a mixed scenario any number of ports 52, 54 may be advertised.

Upon receiving a connection failure, such as a bearer rejection from CUC/CNC 22, 23 of the TSN 20, for example, the NF of the 5G system may repeat its advertising of allocated capabilities, i.e. result "Yes" if decision 44 comprises a test on connection failures. That is, in case of a scenario with a high number of ports, the advertising 43 may change to a scenario of a relative low number of ports, each having a higher QoS. This all, of course, not violating data transmission demands of the second communication network, i.e. the TSN.

Figure 7:
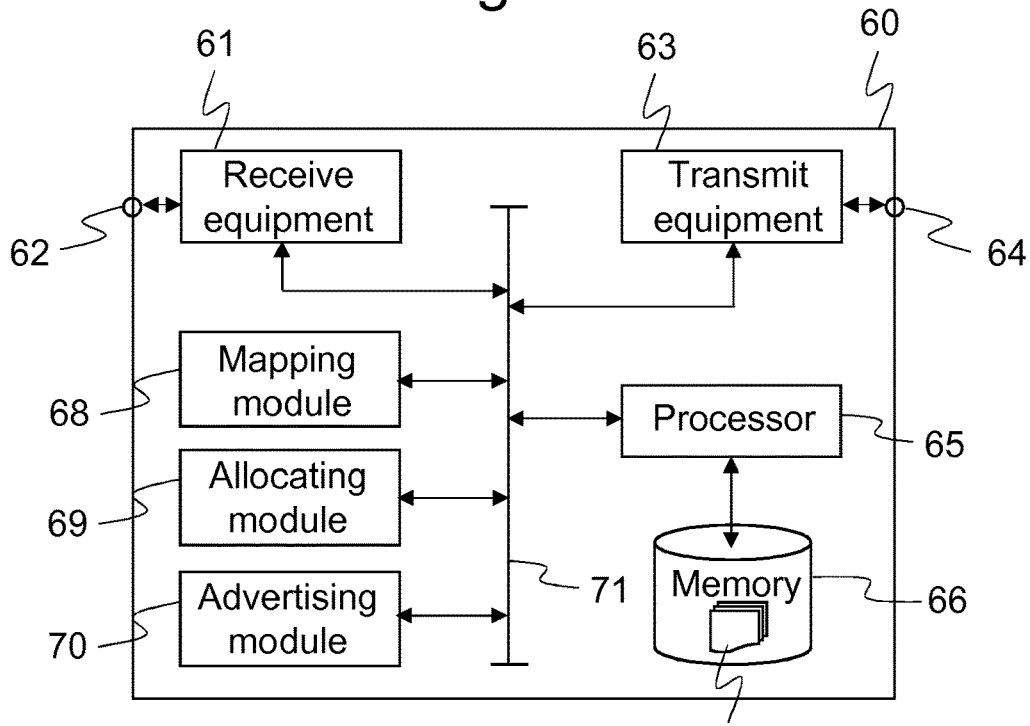
FIG. 7 schematically illustrates a Network Function, NF, node, in particular an Application Function, AF, node according to the present disclosure.

FIG. 7 schematically illustrates a Network Function, NF, node 60 according to the present disclosure, such as configured as an AF 13 in the SBA domain 6, see FIG. 1. Receive and transmit equipment 61, 62; 63, 64 is arranged for communication and data exchange with other NFs of the SBA domain 6.

The NF 60 comprises a processor or a plurality of processors 65 arranged for executing computer readable instructions 67 stored in the memory 66, and a mapping module 68, an allocating module 69 and an advertising module 70. The internal modules and equipment of the NF 60 communicate with one another via a communication bus 71, under the control of the processor or processors 65.

The mapping module 68 is arranged for mapping corresponding communication attributes of the first and second communication networks, in accordance with the present disclosure. The allocating module 69 is arranged for allocating first data communication capabilities of the first communication network for use by the second communication network, based on the attributes mapping and communication resources available in the first communication network, in accordance with the present disclosure.

The advertising module 70 is arranged for advertising the allocated data communication capabilities in the first communication network to the second communication network represented in accordance with the second data communication capabilities based on the attributes mapping, in accordance with the present disclosure, It will be appreciated that the modules disclosed may be implemented as separate hardware and/or software modules and devices, and as software program code or processing routines in a cloud network, physical network nodes or other physical entities available from an SBA domain, and controlled by or executed in a processor or the like. In particular, in an embodiment of the present disclosure, the mapping module 68, the allocating module 69, and the advertising module 70 are implemented in the least one processor 65 of the network function 60. The network function 60, in turn, may be implemented as software routines or software program code in a server or servers or computer equipment of a cloud network, physical network nodes, and/or other physical entities, for example.

The present disclosure is not limited to the examples as disclosed above, and can be modified and enhanced by those skilled in the art beyond the scope of the present disclosure as disclosed in the appended claims without having to apply inventive skills and for use in any data communication, data exchange and data processing environment, system or network.

The invention claimed is:

1. A method of enabling data exchange between a first communication network having first data communication capabilities and a second communication network having second data communication capabilities different from said first data communication capabilities, said first and second data communication capabilities at least comprising different Quality of Service, QoS, and data transmission attributes, wherein said first communication network is a Fifth Generation, 5G, mobile communications network, and said network function of said first communication network operates as an Application Function, AF, of a Service Based Architecture, SBA, domain in a core network of said 5G mobile communications network, said method comprising:
  mapping, in a network function of said first communication network, communication attributes of corresponding first and second data communication capabilities, including said QoS and data transmission attributes;
  allocating, by said network function of said first communication network, based on said attributes mapping and communication resources available in said first communication network, first data communication capabilities of said first communication network for use by said second communication network, wherein said allocating is based on communication resources available in said first communication network excluding communication resources prohibited from being allocated for said second communication network, and
  advertising, by said network function of said first communication network, said allocated data communication capabilities to said second communication network, represented in accordance with said second data communication capabilities based on said attributes mapping, wherein advertising of allocated data communication capabilities comprises advertising a number of data exchange ports and a supported QoS level of a respective port.

2. The method according to claim 1, wherein said allocating and advertising are repeatedly performed by said network function of said first communication network, thereby providing a dynamic interfacing of said first and second communication network.

3. The method according to claim 1, wherein said allocating is based on communication resources available in said first communication network based on an estimate of an expected data exchange in said first communication network.

4. The method according to claim 1, wherein at least one of a number M of data exchange ports each supporting a first QoS level and a number of N data exchange ports each supporting a second QoS level are advertised, wherein said first QoS level is lower than said second QoS level and M>N.

5. The method according to claim 4, wherein said 5G mobile communications network is arranged for exchanging data with further communication networks and User Equipment, UE, wherein said allocating and advertising are further based on fluctuating data exchange characteristics of data exchange between said 5G mobile communications network and said further communication networks and User Equipment, UE, wherein at a first fluctuating level a number M of data exchange ports each supporting said first QoS level is advertised and wherein at a second fluctuating level a number N of data exchange ports each supporting said second QoS level is advertised, wherein said first fluctuating level is higher than said second fluctuating level.

6. The method according to claim 1, wherein said first communication network is a Fifth Generation, 5G, mobile communications network and said second communication network is a Time Sensitive Network, TSN, and wherein said mapping of communication attributes of 5G mobile data communications network data communication capabilities and communication attributes of TSN data communication capabilities includes:

| 5G attributes corresponding to TSN attributes | |
| --- | --- |
| Guaranteed Flow Bit Rate (GFBR) | Interface speed |
| Maximum Packet Loss Rate | Function of (Static Trees + MRP External Control) |
| Packet Delay Budget | Function of (Bridge Delay, propagation delay) |
| Priority level | Qbv traffic classes |
| Maximum Data Burst Volume | MaxFrameSize. |

7. A network function, arranged for operating in a first communication network, for enabling data exchange between said first communication network having first data communication capabilities and a second communication network having second data communication capabilities, different from said first data communication capabilities, said first and second data communication capabilities at least comprising different Quality of Service, QoS, and data transmission attributes, wherein said first communication network is a Fifth Generation, 5G, mobile communications network, and said network function of said first communication network is arranged for operating as an Application Function, AF, of a Service Based Architecture, SBA, domain in a core network of said 5G mobile communications network, said network function comprising:
  a mapping module, arranged for mapping communication attributes of said first and second data communication capabilities, including said QoS and data transmission attributes;
  an allocating module, arranged for allocating first data communication capabilities of said first communication network for use by said second communication network, based on said attributes mapping and said communication resources available in said first communication network, wherein the allocating comprises allocating based on communication resources available in said first communication network excluding communication resources prohibited from being allocated for said second communication network, and
  an advertising module, arranged for advertising said allocated data communication capabilities to said second communication network represented in accordance with said second data communication capabilities based on said attributes mapping, wherein advertising of allocated data communication capabilities comprises advertising a number of data exchange ports and a supported QoS level of a respective port.

8. The network function according to claim 7, wherein said allocating module and said advertising module are arranged for being repeatedly performed by said network function of said first communication network, thereby providing a dynamic interfacing of said first and second communication network.

9. The network function according to claim 7, wherein said mapping module, said allocating module and said advertising module are implemented in at least one processor of said network function.

10. A computer program product, comprising a non-transitory computer readable storage medium storing instructions which, when executed on at least one processor, cause said at least one processor to carry out the method according to claim 1.

11. The network function method according to claim 7, wherein said allocation module arranged for allocating comprises said allocation module arranged for allocating based on communication resources available in said first communication network based on an estimate of an expected data exchange in said first communication network.

\* \* \* \* \*